(12) United States Patent
Vissenberg et al.

(10) Patent No.: US 8,066,419 B2
(45) Date of Patent: Nov. 29, 2011

(54) LIGHTING DEVICE EMPLOYING A LIGHT GUIDE PLATE AND A PLURALITY OF LIGHT EMITTING DIODES

(75) Inventors: Michel Cornelis Josephus Marie Vissenberg, Eindhoven (NL); Tim Dekker, Eindhoven (NL); Willem Lubertus Ijzerman, Eindhoven (NL); Anthonie Hendrik Bergman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 409 days.

(21) Appl. No.: 12/445,314

(22) PCT Filed: Oct. 9, 2007

(86) PCT No.: PCT/IB2007/054104
§ 371 (c)(1),
(2), (4) Date: Apr. 13, 2009

(87) PCT Pub. No.: WO2008/047265
PCT Pub. Date: Apr. 24, 2008

(65) Prior Publication Data
US 2010/0102334 A1  Apr. 29, 2010

(30) Foreign Application Priority Data

Oct. 16, 2006 (EP) .................................. 06122321
Jan. 11, 2007 (EP) .................................. 07100359

(51) Int. Cl.
*F21V 8/00* (2006.01)

(52) U.S. Cl. ...................... 362/612; 362/97.3

(58) Field of Classification Search .................. 362/612, 362/606, 97.3
See application file for complete search history.

(56) References Cited

U.S. PATENT DOCUMENTS

| 5,775,792 A | 7/1998 | Wiese |
| 6,607,286 B2 | 8/2003 | West et al. |
| 7,095,942 B2 | 8/2006 | Lin et al. |
| 7,927,002 B2 * | 4/2011 | Lee et al. ...................... 362/620 |
| 2002/0141006 A1 | 10/2002 | Pocius et al. |
| 2003/0007344 A1 | 1/2003 | Parker |
| 2005/0145867 A1 | 7/2005 | Yau et al. |
| 2005/0259438 A1 * | 11/2005 | Mizutani et al. .............. 362/612 |

FOREIGN PATENT DOCUMENTS

EP          1640756 A1    3/2006

OTHER PUBLICATIONS

Lumileds, "LED Backlight designs using Luxeon high flux light source solutions" 2004, Seattle, http://www.lumileds.com/pdfs/Luxeon_light_source_solutions.pdf.

* cited by examiner

*Primary Examiner* — David V Bruce
(74) *Attorney, Agent, or Firm* — Mark L. Beloborodov

(57) ABSTRACT

The present invention relates to lighting device (10). The lighting device comprises a light guide plate (12), and at least one array of light emitting diodes (LEDs) (14), which LEDs are accommodated in holes arranged in the light guide plate, wherein each hole has: at least two side facets (18) through which light from the LEDs is to be laterally coupled into the light guide plate, and at least one corner (20) formed by two converging side facets of the at least two side facets. This promotes TIR at adjacent light sources and therefore diminishes losses due to absorption or scattering at adjacent holes.

15 Claims, 9 Drawing Sheets

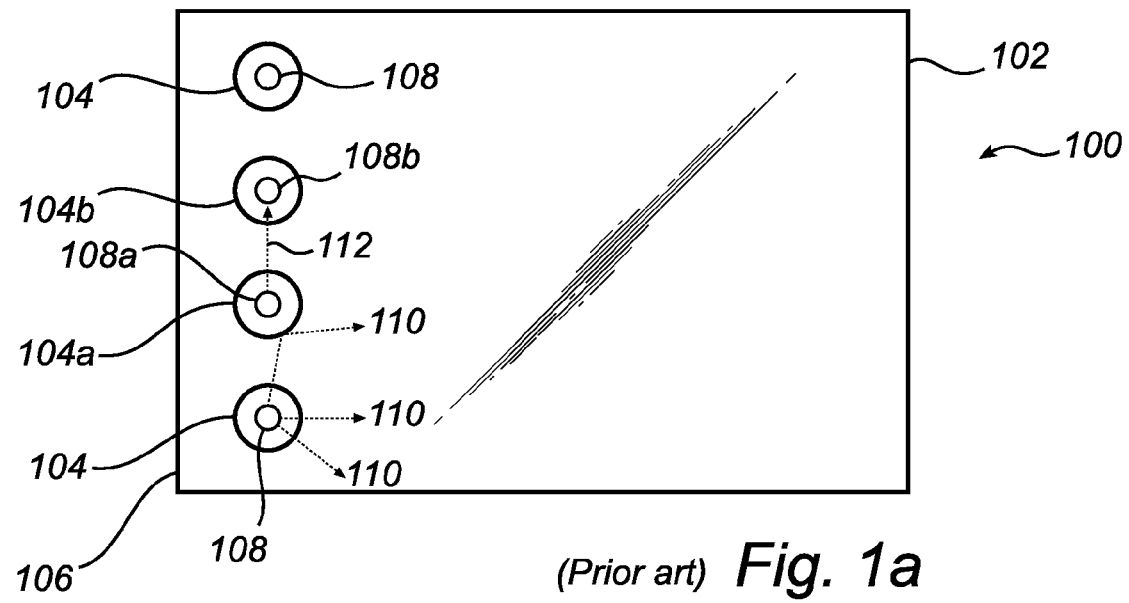
(Prior art) *Fig. 1a*
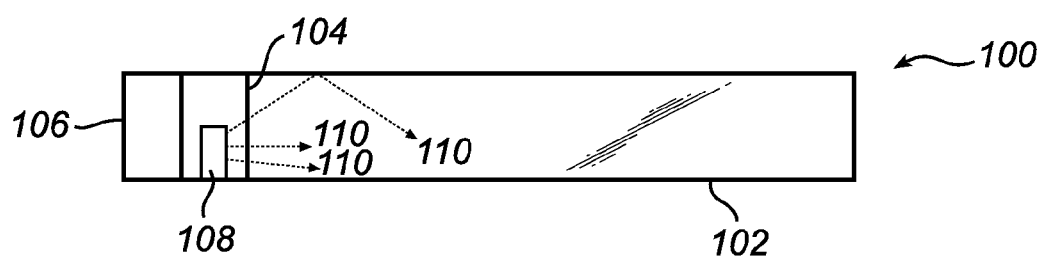
(Prior art) *Fig. 1b*

LIGHTING DEVICE EMPLOYING A LIGHT GUIDE PLATE AND A PLURALITY OF LIGHT EMITTING DIODES

This application is a national stage application under 35 U.S.C. §371 of International Application No. PCT/IB2007/054104 filed on Oct. 9, 2007, which claims priority to European Application No. 06122321.0, filed on Oct. 16, 2006, and European Application No. 07100359.4 filed on Nov. 1, 2006, both incorporated herein by reference.

FIELD OF THE INVENTION

The present invention relates to lighting device comprising a light guide plate and a plurality of light emitting diodes.

BACKGROUND OF THE INVENTION

Progress in the brightness, lumen efficacy and affordability of solid state light sources such as light emitting diodes (LEDs) enables new lighting applications that are no longer restricted to niche markets. LEDs offer several advantages over traditional light sources, such as long lifetime, low operating voltage, instant on, etc. For these and other reasons, LEDs are becoming more and more suited for making lamps for several applications such as color variable lamps, spotlights, LCD backlighting, architectural lighting, stage lighting, etc.

For many lighting applications, the light of a single LED is not sufficient, and light of multiple LEDs needs to be combined to form a light source. One solution is to mix light of multiple LEDs in a light guide, before the light leaves the lighting device. An example of such a solution is disclosed in the document "LED Backlight designs using Luxeon high flux light source solutions" by Lumileds, Seattle 2004, http://www.lumileds.com/pdfs/Luxeon_light_source_solutions.pdf. A backlight based on side-emitting LEDs described in this document is schematically illustrated in FIGS. 1a-1b. With reference to FIGS. 1a-1b, the backlight 100 comprises a light guide 102 provided with circular through holes 104b which are arranged in a linear array along an edge 106 of the light guide. In each through hole, there is provided a side-emitting LED 108, whereby light from the LEDs is coupled into the light guide through the sidewall of the through holes, as illustrated by exemplary ray traces 110.

However, when in such a solution the in-coupling holes 104 are closely spaced, it may occur that light from one LED 108a leaves the light guide 102 through a neighboring hole 104 and gets absorbed or scattered at the LED 108b inside this hole. This is illustrated by exemplary ray trace 112 in FIG. 1a. Simulations have shown that for a densely packed linear array of side-emitting LEDs the light leakage is typically about 10% (5% per neighbor). Thus, the lumen efficiency of such a lighting device is degraded.

SUMMARY OF THE INVENTION

It is an object of the present invention to overcome or at least alleviate this problem, and to provide a lighting device with improved lumen efficiency.

This and other objects that will be apparent from the following description are achieved by means of a lighting device comprising a light guide plate and at least one array of light emitting diodes (LEDs), which LEDs are accommodated in holes arranged in the light guide plate, wherein each hole has: at least two side facets through which light from an LED arranged in the hole is to be laterally coupled into the light guide plate, and at least one corner formed by two converging side facets of the at least two side facets.

By means of the hole structure with a corner between two in-coupling side facets, light from a LED arranged in the hole may be split up in sub-beams, each of which is more or less perpendicular to its originating side facet, allowing control of the direction of the light to prevent light from entering adjacent holes. As a result, losses due to absorption or scattering at adjacent light sources in the lighting device can be diminished, and the luminous efficiency of the lighting device can be increased. To this end, preferably, the holes are arranged such that the sub-beams will reflect off the side facets of an adjacent hole, and consequently not enter the adjacent hole.

For instance, in one embodiment, a corner of the at least one corner of one hole points towards an adjacent hole. That is, preferably, the extension of an imaginary line between the center and the corner of the hole traverses the adjacent hole. By pointing a corner of a hole in a given direction, less light will be sent to that direction. Therefore, light coupled into the light guide plate through the in-coupling side facet of one hole generally (if ever) hits the side facet(s) of the adjacent hole at larger angles of incidence (compared to the prior art case discussed above, for example), thereby increasing the probability of total internal reflection (TIR) at the side facet of the adjacent hole so that the light does not enter that hole.

In another embodiment, the corner of the one hole and a corner of the adjacent hole are pointing towards each other. That is, the corner of the one hole is pointing not only towards the adjacent hole, but specifically towards a corner of the adjacent hole. This further ensures that light from a first hole does not enter a second neighboring hole, and vice versa, but instead is reflected by TIR.

As indicated above, a hole with "a corner" is not necessarily limited to a single corner hole. To this end, in preferred embodiments, each hole has a square lateral cross-section ('lateral' is in relation to the plane of the light guide plate). Alternatively, a hole can be triangular, pentagonal, hexagonal, rhombic, kite-shaped, have the shape of opposing arcs, etc. Further, the shapes are not necessarily regular.

The light guide plate preferably comprises at least one out-coupling structure for coupling light out of the light guide plate. The out-coupling structure can for example be an edge of the light guide plate or a tilted mirror arranged in the light guide plate to direct light out of the light guide plate in the direction of the light guide plate normal. Alternatively, the out-coupling structures can be formed by grooves, dents or scattering material, for example. In relation to the out-coupling structure(s), the side facets of the holes are preferably aligned with the at least one out-coupling structure. Such an arrangement ensures that the light beams emanating from the holes hits the out-coupling structures from an essentially perpendicular direction, which may result in uniform and collimated light coupled out from the light guide plate. In a preferred embodiment, the light guide plate has a square shape with out-coupling edges and a linear array of square holes arranged corner to corner is aligned with the diagonal direction of the square light guide plate. In such an embodiment, the side facets of the square holes are more or less parallel to the out-coupling edges of the square light guide plate. A single LED array can be placed on the diagonal, or four LED arrays forming a square rotated about 45° in relation to the square light guide plate can be used, for example.

Instead of a linear array, the LEDs can alternatively be arranged in a circular array. In a circular array, the hole shape may be selected to promote out-coupling and/or prevent interactions between LEDs at opposite sides of the array. Also, the light guide plate may have a circular shape with an out-coupling circumference concentric with the circular LED array, to ensure that the angles of incidence towards the out-coupling structure not become too large.

The light guide plate can further have means for aiming light emitted from the LEDs towards areas of the light guide plate free from holes. The directing means can for example comprise slits or other reflecting elements. In one embodiment, wherein an LED array is arranged along a reflective edge of the light guide plate, the directing means comprises slits arranged such that light reflected by the edge is aimed towards the spaces between the holes of the array, thereby significantly decreasing the probability that light is lost at nearby light sources. In a specific embodiment, the light guide plate has the shape of a right triangle wherein one cathetus of the triangular light guide plate is formed by the reflective edge along which the LEDs are placed. The other cathetus is preferably also a reflective edge and the hypotenuse preferably comprises an out-coupling structure for coupling light out of the light guide plate, as discussed above. Such a triangular lighting device has a uniform and collimated light distribution. In another embodiment, wherein two LED arrays are arranged along each other, the directing means comprises slits arranged such that light from one array is aimed towards the spaces between the holes of the other array, thereby significantly decreasing the probability that light is lost at nearby light sources.

BRIEF DESCRIPTION OF THE DRAWINGS

This and other aspects of the present invention will now be described in more detail, with reference to the appended drawings showing currently preferred embodiments of the invention.

FIG. 1a is a top view of a backlight according to prior art,

FIG. 1b is a cross-sectional side view of the backlight of FIG. 1a,

DETAILED DESCRIPTION

Figure 2A:
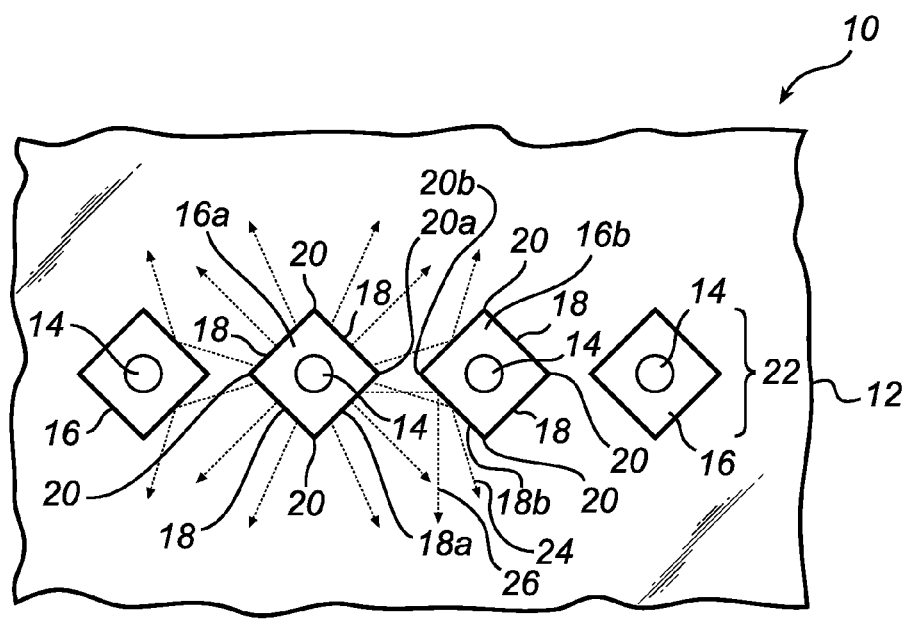
FIG. 2a is a partial top view of a lighting device according to an embodiment of the invention.

A light emitting diode (LED) based lighting device according to an embodiment of the present invention will now be described with reference to FIGS. 2a-2b. The lighting device denoted 10 comprises a light guide plate 12. The light guide plate 12 is transparent and can be made of glass or plastics, for example.

The lighting device 10 further comprises a plurality of LEDs generally designated 14 accommodated in holes generally designated 16 and arranged in the light guide plate 12. The holes 16 could be through holes (as in FIG. 2b) or holes having an opening towards one side of the light guide plate 12 only. The LEDs 14 are preferably side-emitting omnidirectional LEDs. Alternatively, unidirectional LEDs or clusters of unidirectional LEDs that are aimed in opposite directions can be used.

Figure 2B:
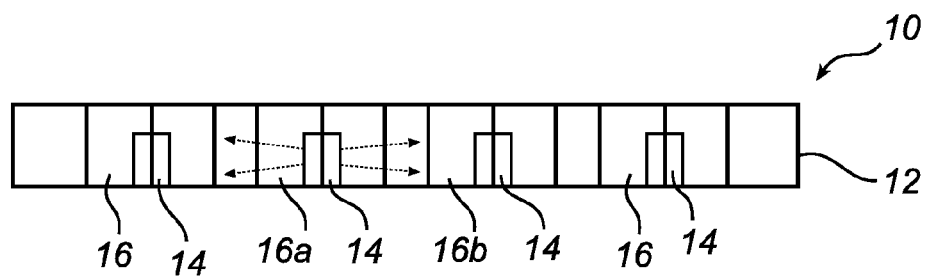
FIG. 2b is a cross-sectional side view of the lighting device of FIG. 2b, FIGS. 3a-3g illustrate various lighting devices of the type disclosed in FIGS. 2a-2b, FIGS. 4a-4c illustrate exemplary hole shapes.

Each hole 16 in the embodiment illustrated in FIGS. 2a-2b is square-shaped with four in-coupling side facets generally designated 18. Between each two adjoining in-coupling side facets 18, a corner generally designated 20 is formed. The corners of the square holes are 90°. When the LED 14 is in operation, light is coupled into the light guide plate 12 through the side facets 18 and forms four beams of light rays essentially orthogonal to the respective side facets 18 of the hole 16.

The holes 16 are further oriented and placed such that at least one corner 20a of a hole 16a is pointing towards an adjacent hole 16b, as seen in the plane of the light guide plate. More precisely, in the embodiment illustrated in FIGS. 2a-2b, the LEDs 14 (and consequently the holes 16) are arranged in a linear array 22 such that the corner 20a of the hole 16a is pointing towards a corner 20b of the adjacent hole 16b, and the corner 20b of the adjacent hole 16b is pointing towards the corner 20a of the holes 16a. In other words, the holes are rotated about 45° from a position side along side.

Upon operation of the lighting device 10, light 24 in-coupled from hole 16a through side facet 18a into the light guide plate 12 that hits the side facets 18b of the adjacent hole 16b does so at larger angles of incidence compared to the prior art case illustrated in FIGS. 1a-1b where the holes have a circular shape and the angle of incidence may be very small. The probability of total internal reflection (TIR) at the side facets 18b of the adjacent hole 16b is thereby significantly increased. Consequently, a smaller amount of light or no light at all from the hole 16a enters the adjacent hole 16b so that little or no scattering and/or absorption occurs at the LED 14 in that hole 16b. Overall, this increases the luminous efficiency of the lighting device 10.

The lighting device 10 may further comprise means (not shown) for coupling light out of the light guide plate 12, such as tilted reflective elements.

TIR in the above context presumes the that light from a holes 16a strikes a side facet 18b of an adjacent hole 16b at a sufficiently large angle of incidence given the light guide plate 12 and hole 16 materials. The angle of incidence is measured with respect to the normal at the refractive boundary. For a light guide plate 12 made of glass (refractive index n of about 1.5) and holes 16 filled with air, such an angle of incidence is in the order of arcsin $1/n=42°$. To this end, in the above embodiment, any light 26 exiting the hole 16a at 42° or less with respect to the side facet normal towards the nearest side facet 18b of hole 16b will hit that side facet at 48° or more (>42°, safety margin of 6°) (or not hit the side facet 18b at all), and will consequently be reflected without entering the hole 16b. In contrast, any light exiting the hole 16a at say 50° or more towards the side facet 18b of hole 16b would hit that side facet at 40° or less (<42°), and would thus enter the hole 16b. However, when using an omnidirectional side-emitter in a square-shaped hole as above, the angle of departure cannot exceed 42°, as will be appreciated by a person skilled in the art.

Also, the angles of departure and incidence and thus the occurrence of TIR depend on the shape of the holes. Namely, the probability of TIR at an adjacent hole is generally larger for opposing acute angle corners than for opposing obtuse angle corners. To this end, the relative angle between the exit side facet 18a and the receiving side facet 18b of adjacent holes, which angle depends on the corner radius and the alignment of the adjacent holes, should be sufficiently large to allow TIR. In the above embodiment it has been shown that a corner radius of 90° (square-shaped holes) in a linear array is enough for TIR. Various lighting devices of the type disclosed in FIGS. 2a-2b will now be described in relation to FIGS. 3a-3g.

Figure 3A:
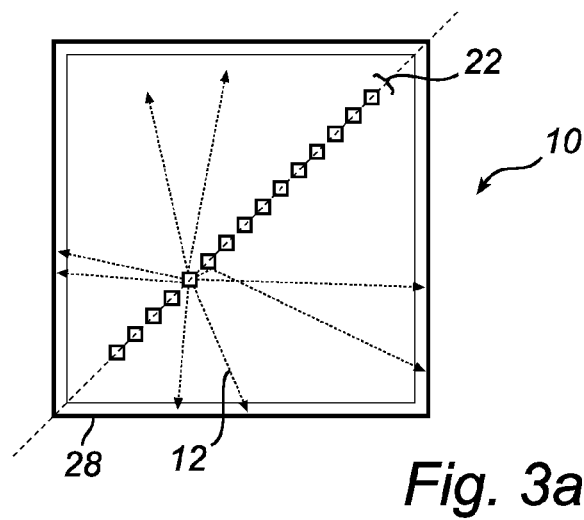

FIG. 3a is a top view of a lighting device 10 having a square light guide plate 12. The outer edges 28 of the light guide plate 12 are adapted to couple light out of the light guide plate 12. One linear array 22 of the type discussed in relation to FIG. 2 above is further provided in the light guide plate 12. Namely, the array 22 is aligned with the diagonal direction of the light guide plate 12 so that the side facets 18 of the holes 16 are parallel to the out-coupling edges 28 of the light guide plate 12. In this way, during operation, most light beams emanating from the holes 16 hit the edges 28 from an essentially perpendicular direction.

Figure 3B:
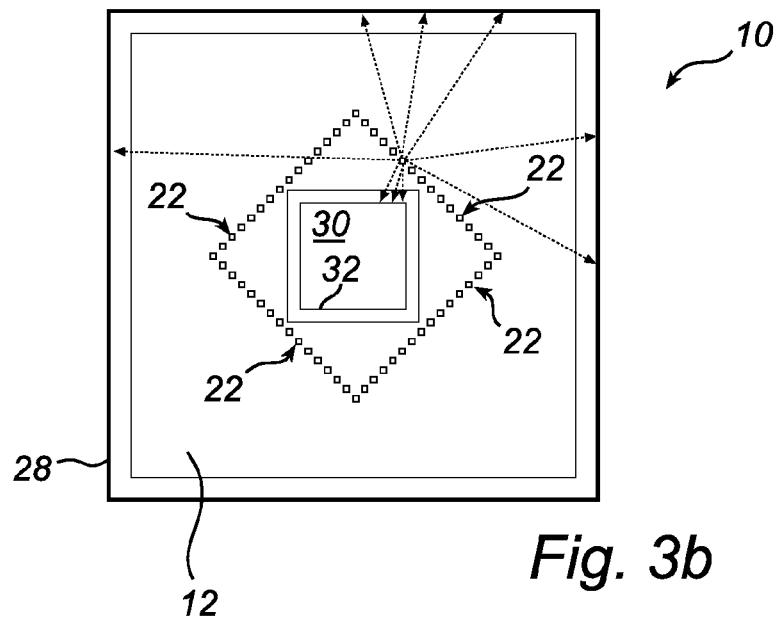

The lighting device of FIG. 3b is a further development of the square lighting device of FIG. 3b. In the lighting device 10 of FIG. 3b, a hole 30 with square shape is provided in the center of the light guide plate 12, and the resulting inner edges 32 are adapted to couple light out of the light guide plate 12. Four linear arrays 22 of the type discussed in relation to FIG. 2 above are further provided in the light guide plate 12. Namely, the four arrays 22 with holes and LEDs form a square rotated about 45° in relation to the light guide plate 12, which square is placed around the center hole 30. That is, the arrays 22 are aligned with the diagonal direction of the light guide plate 12 so that the side facets of the holes are parallel to the out-coupling edges 28 and 32 of the light guide plate 12. In this way, during operation, most light beams emanating from the holes 16 hits the edges 28 and 32 from an essentially perpendicular direction, which results in uniform and collimated light coupled out from the light guide plate 12.

Figure 3C:
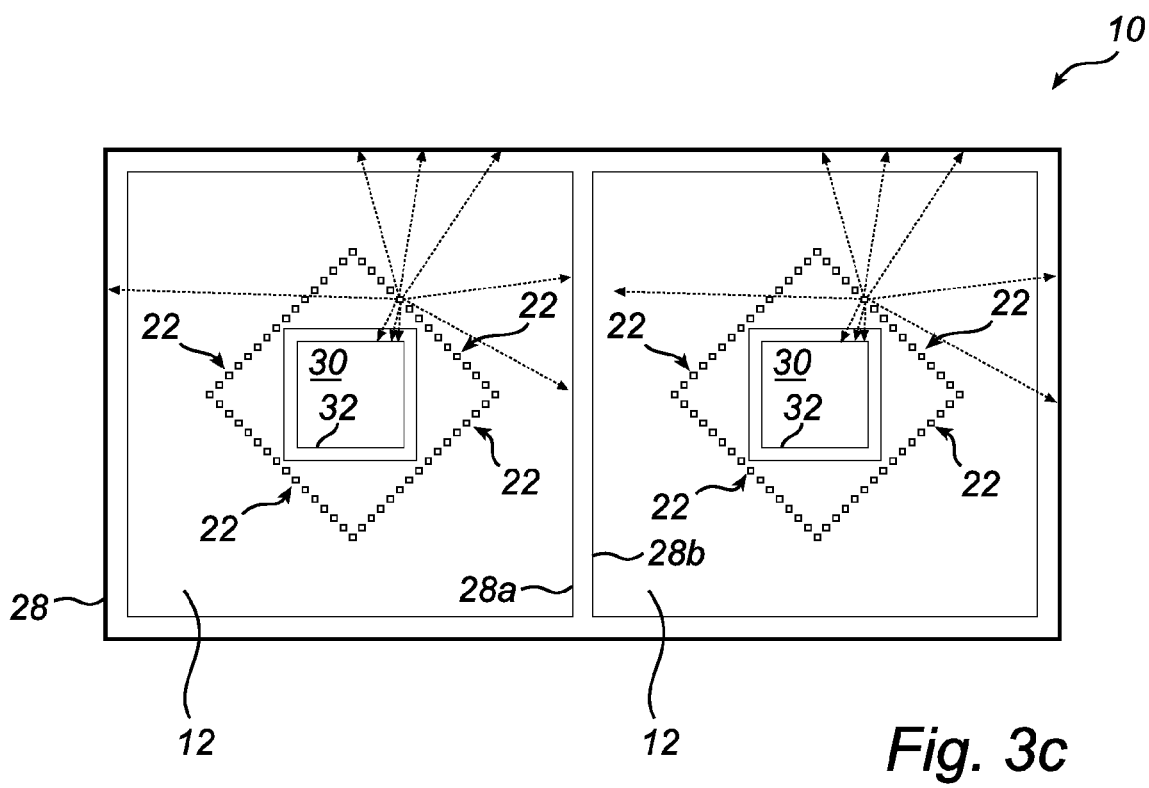

The lighting device 10 in FIG. 3c is a rectangular lighting device consisting of two square lighting devices of the type illustrated in FIG. 3b placed next to each other. The two outer out-coupling edges 28a and 28b facing each can optionally be replaced by a mirror.

Figure 3D:
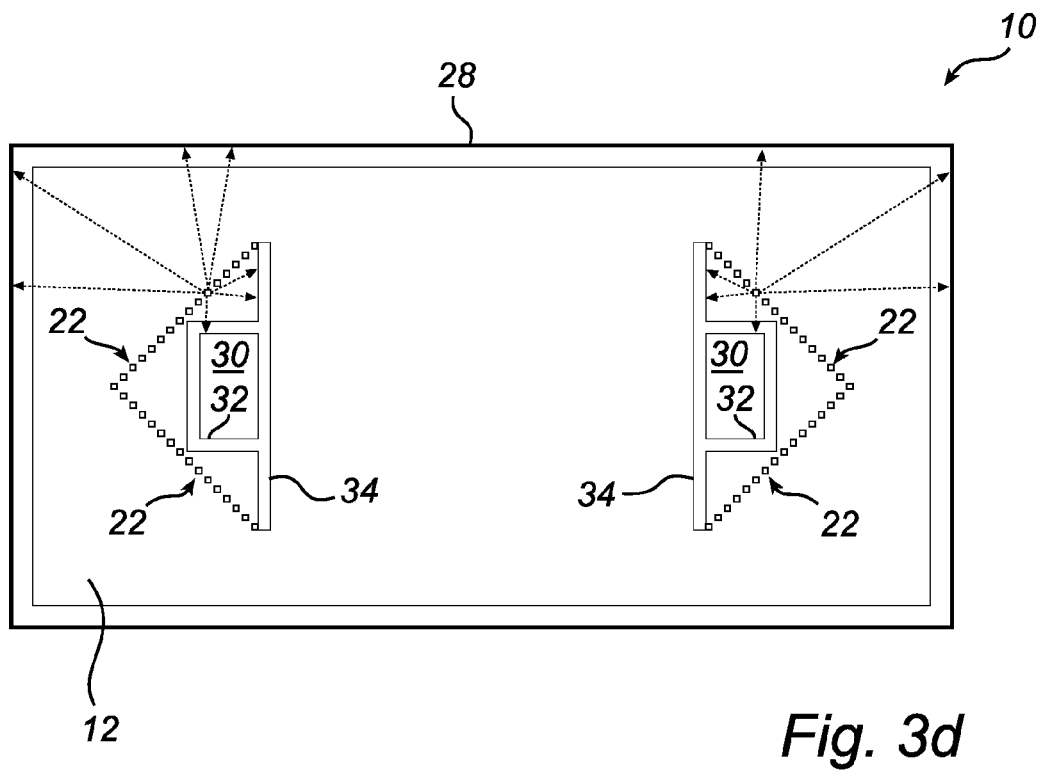
Figure 3E:
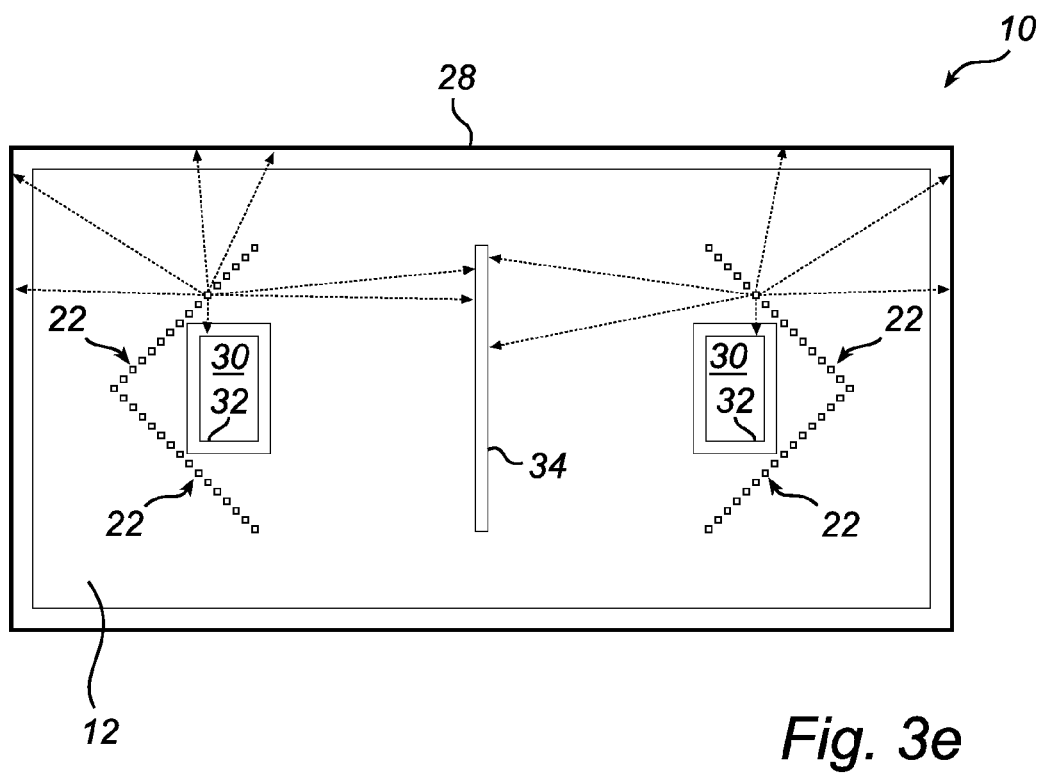

FIGS. 3d-3e illustrate other rectangular lighting devices 10 wherein basically the square center hole and rotated square of four arrays from FIG. 3b are split in two and distanced from each other, forming two sets each comprising two linear arrays 22 arranged in a right angle and a hole 30 with rectangular shape and out-coupling edges 32. Additional out-coupling structures 34 can be arranged at each set, or a single out-coupling structure 34 can be placed between the two sets. The out-coupling structure 34 can for example be a tilted mirror or the like.

Figure 3F:
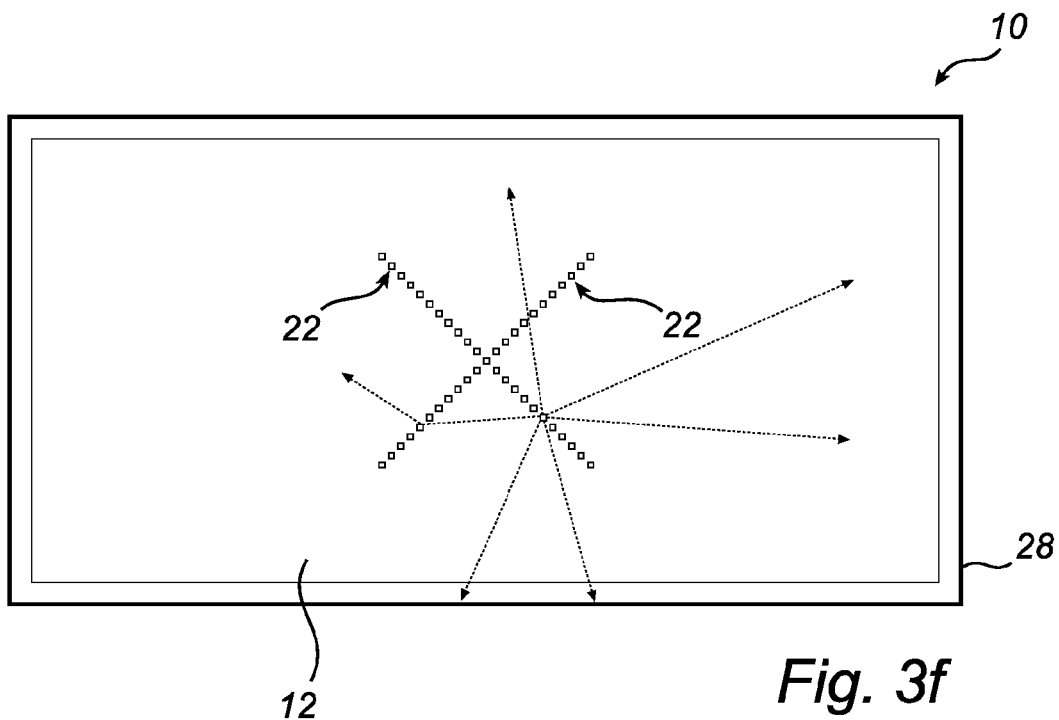

FIG. 3f illustrates another rectangular lighting device 10 wherein two linear arrays 22 form an "X" located in the middle of the light guide plate 12.

Figure 3G:
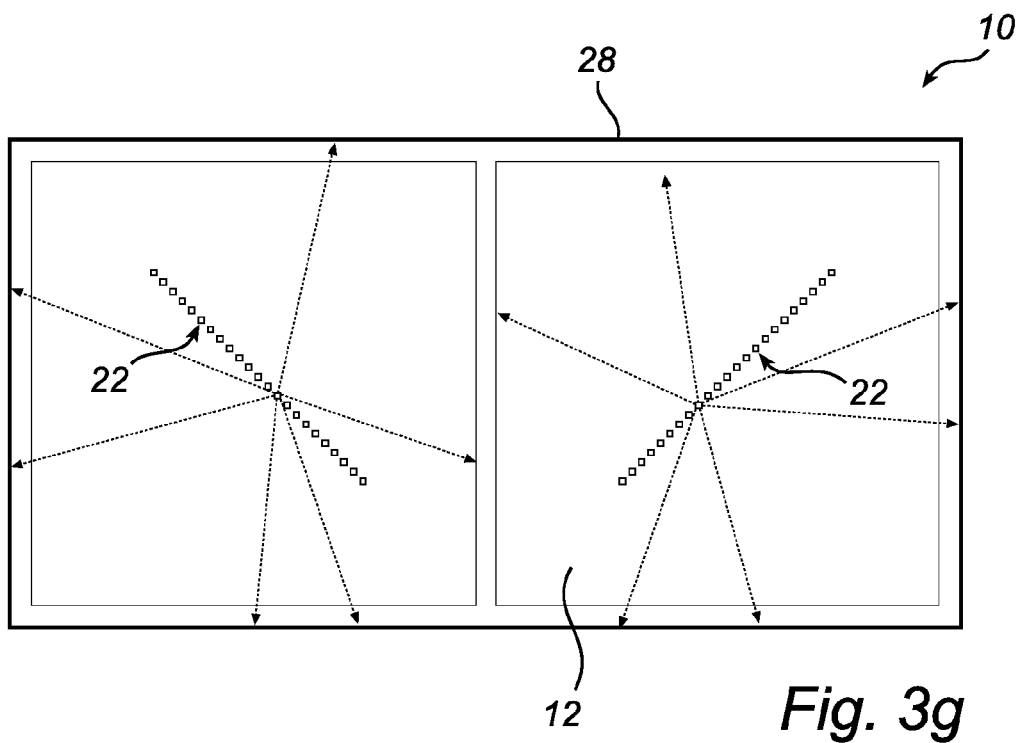

Finally, FIG. 3g illustrate yet another rectangular lighting device 10 consisting of two square lighting devices of the type illustrated in FIG. 3a placed next to each other. The two diagonally placed linear arrays 22 are mirror images of each other.

Figure 4A:
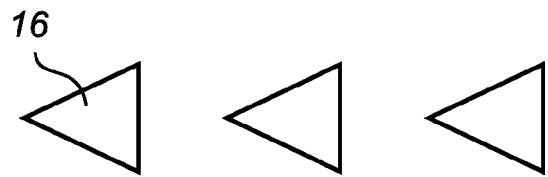
Figure 4B:
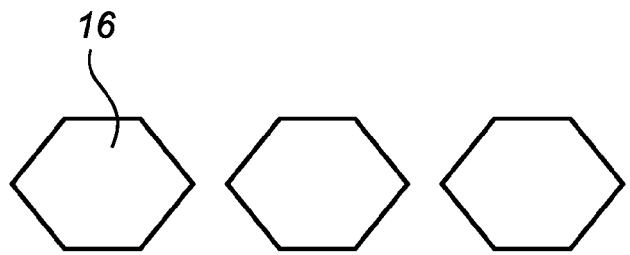
Figure 4C:
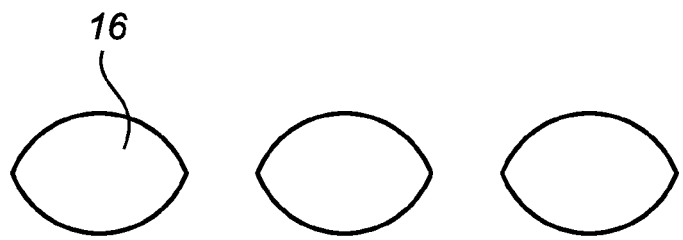
Figure 5:
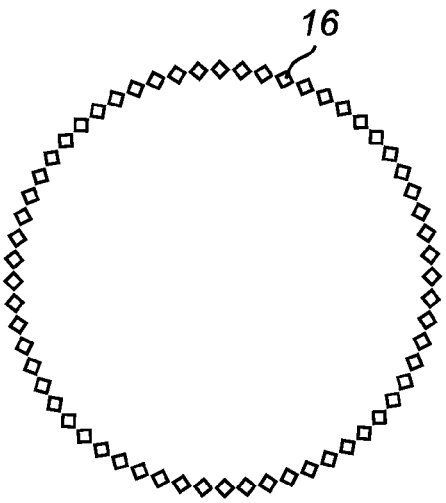
FIG. 5 is a top view of a lighting device according to an embodiment with a circular LED array.

Instead of square-shaped holes 16 as in FIGS. 2-3 above, the holes could have other shapes achieving similar results, such as triangular holes (FIG. 4a), hexagonal holes (FIG. 4b), and holes having the shape of opposing arcs (FIG. 4c). Note that the hexagonal holes of FIG. 4b have an irregular hexagonal shape with sharper corners facing each other, to ensure TIR as discussed above. Also, instead of a linear arrays as in FIGS. 2-3 above, the LEDs 14 could be arranged in circular arrays, as schematically illustrated in FIG. 5. In FIG. 5, square-shaped holes are arranged in a circle. The circle should have a sufficient radius so that the TIR at adjacent holes is not compromised. More specific, for square holes, the holes can be rotated up to about 6° (the safety margin stated above) with respect to each other with maintained TIR. The circular array is advantageously combined with a circular light guide plate with an out-coupling circumference (not shown). Such a circular light guide could also have an inner out-coupling structure, analogue to the square ditto in FIG. 3b.

Figure 6A:
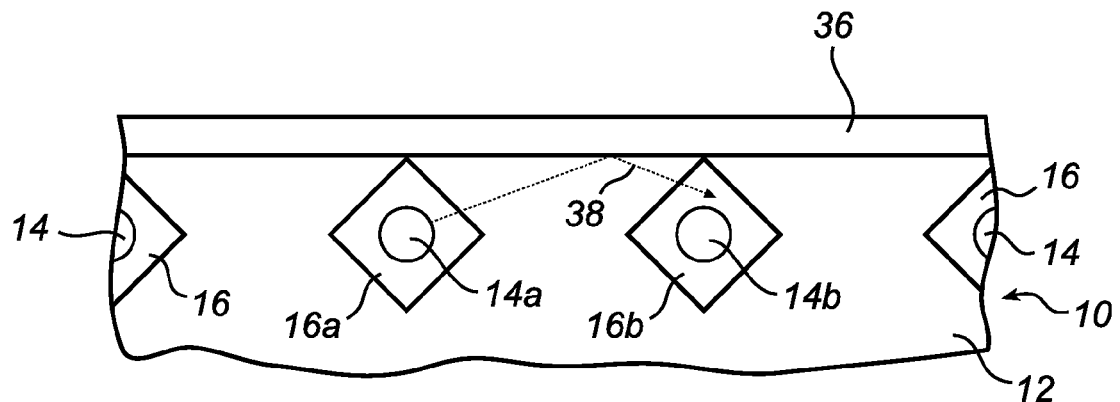
FIG. 6a is partial a top view of a lighting device with a light guide plate having a reflective edge.
Figure 6B:
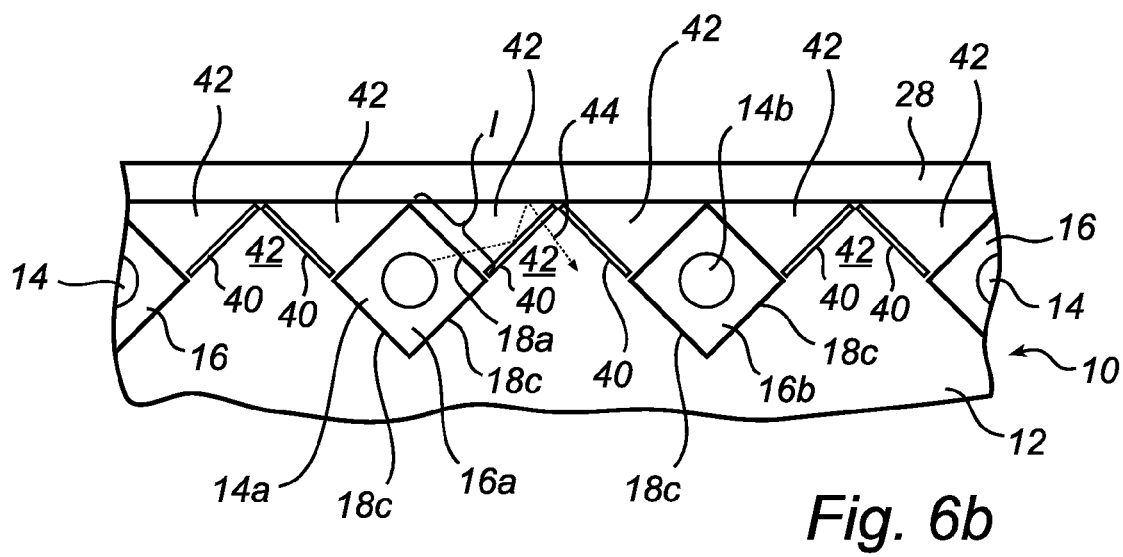
FIG. 6b is a partial top view of the lighting device of FIG. 6a with additional slits according to another embodiment of the invention.

FIGS. 6a-6b illustrate a lighting device 10 in which the light guide plate additionally has a reflective edge 36, such as a mirror. The reflective edge 36 serves to prevent any light from escaping through the edge of the light guide plate 12, and reflects light incident on the edge back into the light guide plate. However, even though square holes 16 arranged corner to corner are used, light from one hole 16a can be reflected by the reflective edge 36 towards another nearby hole 16b with such an angle of incidence that TIR does not occur and the light enters the hole 16b and is scattered and/or absorbed at the LED 14b accommodated in the hole 16b. This is illustrated in FIG. 6a by exemplary ray trace 38.

To prevent this, the light guide plate 12 is provided with a plurality of air slits 40 arranged such that light reflected by the edge is aimed towards the spaces 42 between the holes 16, as illustrated in FIG. 6b. For square holes 16 rotated about 45° with respect to the reflective edge 36 and placed close to the reflective edge 36, the air slits 40 extend between the hole 16 and the reflective edge 36 in the extension of the side facets 18c facing away from the reflective edge 36. Thus, separate light guides 44 are formed, each of which extends in the direction of the normal of the side facet 18 towards the reflective edge 36 and has a width equal to length/of the side facet 18. A light ray 44 that is emitted at a small angle of departure more or less parallel to one of the slits 40, which light ray otherwise would have been reflected off the edge 36 and into the hole 16b (as in FIG. 6a), is reflected by the slit 40 via TIR. Thus, in general, the divergence of a beam consisting of a plurality of rays exiting the side facet is limited by means of the slits 40. After reflection at the edge 36, the light ray 44 changes direction and travels towards the slit 40 at a smaller angle of incidence and will therefore pass it and enter into the space 42 between the holes 16a and 16b. Some Fresnel reflections in the wrong direction (Fresnel losses) may however occur. These Fresnel losses may be suppressed by filling the slits 40 with a material with a refractive index lower than that of the material of the light guide plate 12.

Figure 6C:
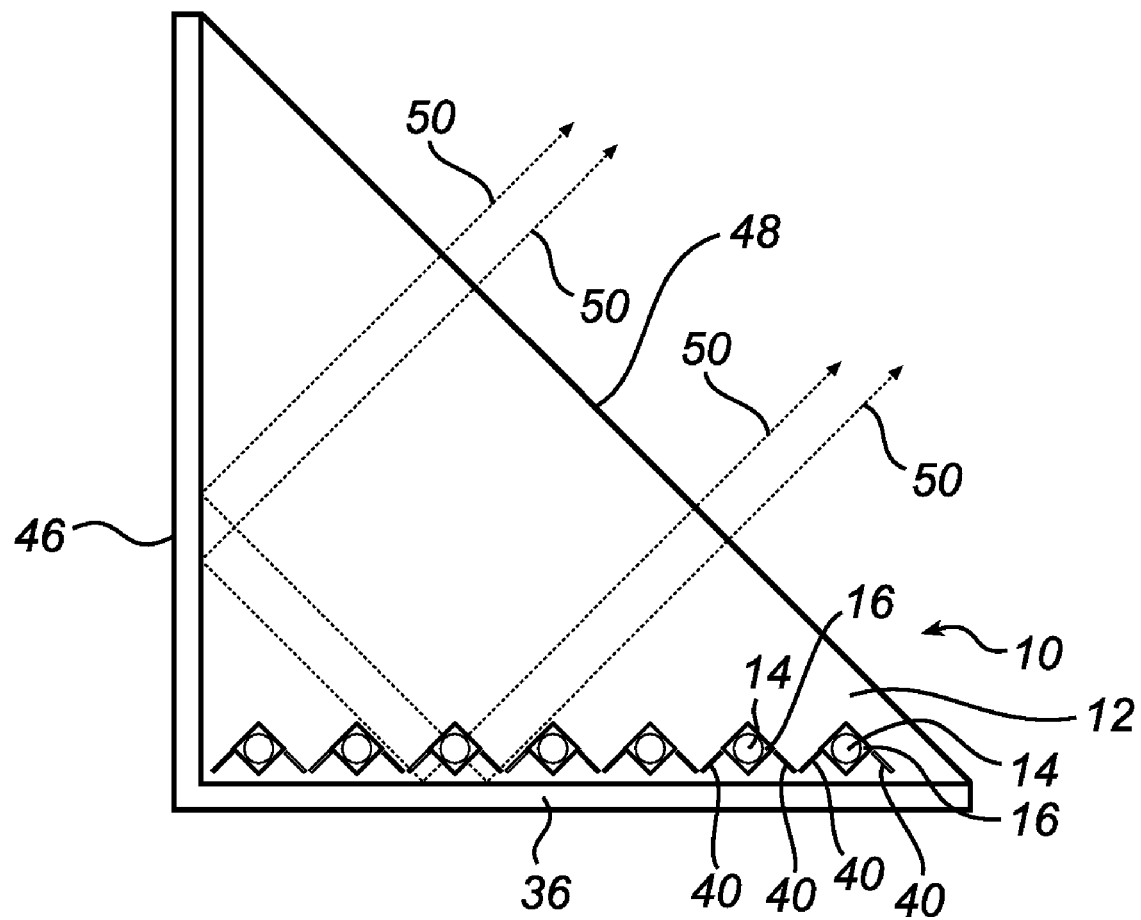
FIG. 6c is a schematic top view of a specific embodiment of the lighting device of FIG. 6b.

FIG. 6c schematically illustrates a specific embodiment of the lighting device of FIG. 6b. Here, the light guide plate 12 has the shape of a right triangle. The reflective edge 36, along which the LEDs 14 are placed, constitutes one cathetus or leg side of the right triangle. The other cathetus is also a reflective edge 46 and the hypotenuse comprises an out-coupling structure 48 in the form of a tilted reflective edge. The reflective edge can for example be a TIR mirror or a regular mirror.

Upon operation, light emitted from all four side facets of each hole 16 is directed towards the out-coupling structure 48, either directly or via at least one of the reflective cathetus edges 36 and 46, and hits the out-coupling structure 48 at an essentially right angle. This is illustrated by exemplary ray-traces 50 and it provides for a uniform and collimated light distribution.

The triangular lighting device just described can advantageously be placed in a corner of a room. Except for illumination purposes, it can also serve as a shelf, for instance for a television set. It should be noted that the triangular lighting device could be embodied without the slits 40, but such a triangular lighting device would have a somewhat degraded performance. Also, the out-coupling structure 48 could instead of being straight be curved in the longitudinal direction.

Figure 7A:
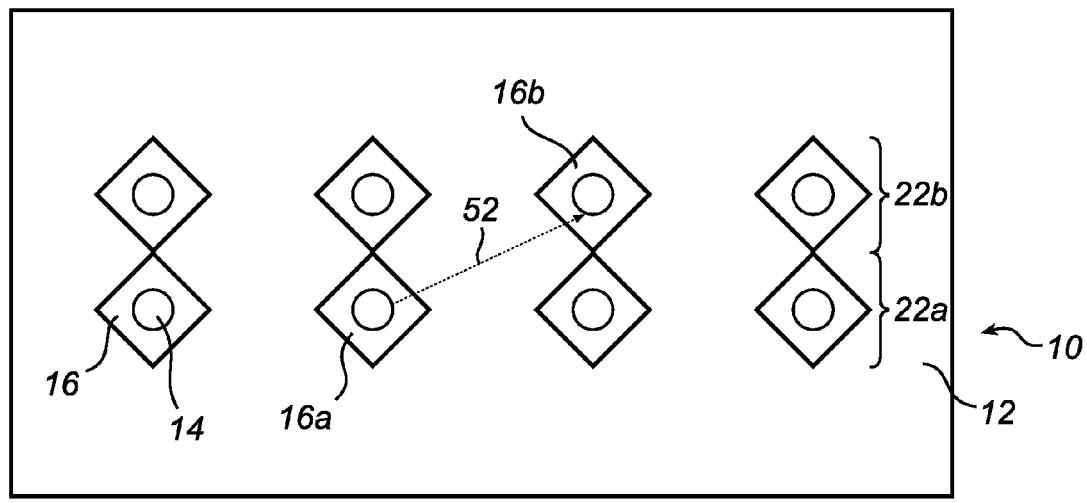
FIG. 7a is a top view of a lighting device with parallel arrays of LEDs.
Figure 7B:
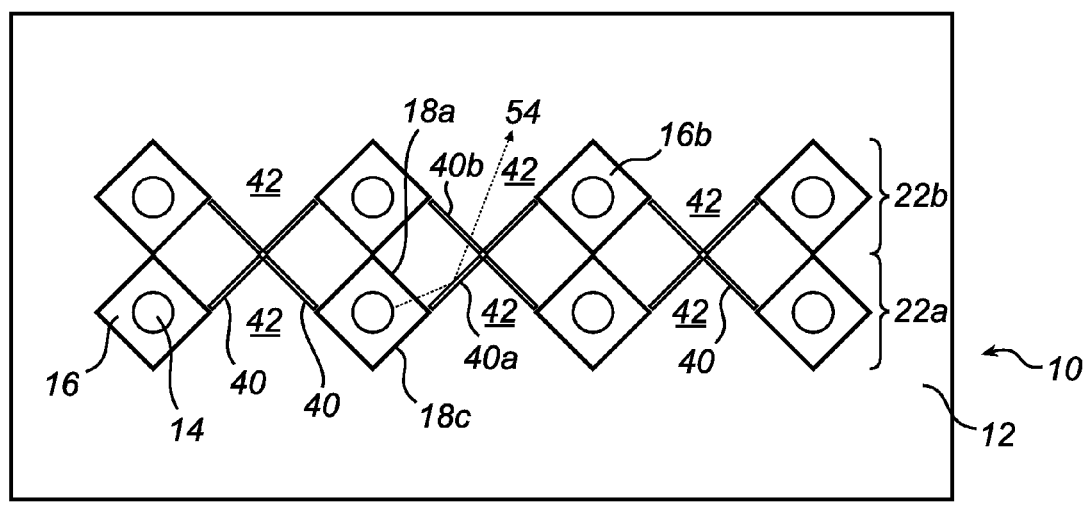
FIG. 7b is a top view of the lighting device of FIG. 7a with additional slits according to yet another embodiment of the invention.

FIGS. 7a-7b illustrate a lighting device 10 in which a linear array 22a of LEDs 14 is arranged parallel to another linear array 22b of LEDs 14. However, even though square holes 16 arranged corner to corner are used, light from a hole 16a in one array 22a can be incident on a nearby hole 16b in the other array 22b with such an angle of incidence that TIR does not occur and the light enters the hole 16b and is scattered and/or absorbed at the LED 14b accommodated in the hole 16b. This is illustrated in FIG. 7a by exemplary ray trace 52. To prevent this, the light guide plate 12 is provided with a plurality of air slits 40 arranged such that light from one array 22a is aimed towards the spaces 42 between the holes of the other array 22b, as illustrated in FIG. 6b. For square holes 16 arranged corner to corner in two linear parallel LED arrays 22a, 22b, the air slits 40 of one array 22a extend away from a side facet 18a facing the other array 22b in the extension of a side facet 18c facing away from the other array 22b. A light ray 54 that is emitted at a small angle of departure more or less parallel to one of the slits 40a, which light ray otherwise would entered the hole 16b of the array 22b (as in FIG. 7a), is reflected by the slit 40a via TIR. Thus, in general, the divergence of a beam consisting of a plurality of rays exiting the side facet is limited by means of the slit. After reflection at the slit 40a, the light ray 54 travels towards the corresponding slit 40b of the array 22b at a smaller angle of incidence and will therefore pass it into the light guide plate 12 towards the space 42.

The person skilled in the art realizes that the present invention by no means is limited to the preferred embodiments described above. On the contrary, many modifications and variations are possible within the scope of the appended claims. For example, the embodiments illustrated in FIGS. 6b and 7b respectively can be combined in a lighting device with at least parallel LED arrays and at least one reflective edge.

The invention claimed is:

1. A lighting device, comprising:
   a light guide plate defining a plurality of holes, and
   at least one array of light emitting diodes (LEDs) at least partially disposed in the holes, wherein
   each hole comprises at least two converging side facets through which light from an LED disposed in said hole is to be laterally coupled into the light guide plate, the side faces forming at least one corner pointing at an adjacent hole.

2. A device according to claim 1, wherein the holes are arranged such that light from a LED arranged in a hole is split up in sub-beams directed such that they will reflect off the side facets of an adjacent hole.

3. A device according to claim 1, wherein the extension of an imaginary line between the center and the corner of the hole traverses the adjacent hole.

4. A device according to claim 1, wherein the corner of the one hole and a corner of the adjacent hole points towards each other.

5. A device according to claim 1, wherein the lateral cross-section shape of each hole is substantially square.

6. A device according to claim 1, wherein the light guide plate comprises at least one out-coupling structure for coupling light out of the light guide plate and wherein the side facets of each hole are aligned with the at least one out-coupling structure.

7. A device according to claim 1, wherein the at least one LED array comprises at least one linear LED array.

8. A device according to claim 1, wherein the light guide plate is square-shaped and the at least one linear LED array is arranged at about 45° angle with respect to the square light guide plate.

9. A device according to claim 1, wherein the at least one LED array comprises at least one circular LED sub-array.

10. A device according to claim 9, wherein the light guide plate is circular-shaped.

11. A device according to claim 1, wherein the light guide plate further comprises means for directing light emitted from the LEDs passing said directing means towards areas of the light guide plate free from holes.

12. A device according to claim 11, wherein an LED array is arranged along a reflective edge of the light guide plate and wherein the directing means comprises slits arranged such that light reflected by the edge is directed towards spaces between the holes of the array.

13. A device according to claim 12, wherein the light guide plate has the shape of a right triangle and wherein one cathetus of the triangular light guide plate is formed by the reflective edge.

14. A device according to claim 13, wherein the other cathetus of the triangular light guide plate is a reflective edge and the hypotenuse of the triangular light guide plate comprises an out-coupling structure for coupling light out of the light guide plate.

15. A device according to claim 11, wherein two LED arrays are arranged along each other and wherein the directing means comprises slits arranged such that light from one array is directed towards spaces between the holes of the other array.

* * * * *